United States Patent [19]
Amussen

[11] Patent Number: 6,142,432
[45] Date of Patent: Nov. 7, 2000

[54] IMPLEMENT HOLDER

[76] Inventor: Gregory P. Amussen, 4108 52nd St., NE., Tacoma, Wash. 98422-1979

[21] Appl. No.: 09/154,601

[22] Filed: Sep. 16, 1998

[51] Int. Cl.[7] .............................. A45D 42/14; F16B 47/00
[52] U.S. Cl. ...................................... 248/205.5; 248/205.8
[58] Field of Search .............................. 248/205.5, 205.8, 248/206.1, 206.2, 309.3, 467, 362, 175, 302, 537, 538, 514, 515, 516, 534, 535, 519, 520, 521, 309.1, 310, 346.01, 346.03, 346.06; 24/10 R, 11 S, 11 C

[56] References Cited

U.S. PATENT DOCUMENTS

| | | | |
|---|---|---|---|
| D. 115,180 | 6/1939 | Holden | D8/363 |
| D. 136,856 | 12/1943 | Olowecki | D22/147 |
| D. 266,932 | 11/1982 | Liset | D16/129 |
| D. 293,359 | 12/1987 | Gust et al. | D22/147 |
| D. 322,544 | 12/1991 | Amussen | D8/373 |
| D. 322,554 | 12/1991 | Amussen | D8/373 |
| D. 351,452 | 10/1994 | Nielson | D22/148 |
| D. 379,142 | 5/1997 | Miller | D8/71 |
| 2,009,360 | 7/1935 | Koch | 120/108 |
| 2,144,159 | 1/1939 | Kieft | 248/206 |
| 2,202,242 | 5/1940 | Wortham | 248/300 |
| 2,297,806 | 10/1942 | Smith | 120/108 |
| 2,501,942 | 3/1950 | Hueter | 248/362 |
| 2,595,562 | 5/1952 | Becker | 248/205 |
| 3,186,671 | 6/1965 | Standley | 248/302 |
| 4,004,365 | 1/1977 | Manchester | 43/17 |
| 4,043,531 | 8/1977 | Green | 248/537 |
| 4,366,640 | 1/1983 | Clapp | 43/21.2 |
| 4,588,153 | 5/1986 | Boston | 248/74.2 |
| 5,163,752 | 11/1992 | Copeland | 362/396 |
| 5,557,877 | 9/1996 | Colson | 43/21.2 |
| 5,649,634 | 7/1997 | Irizarry | 211/120 |

FOREIGN PATENT DOCUMENTS

| | | |
|---|---|---|
| 549130 | 6/1956 | Belgium . |
| 1479570 | 5/1967 | France . |
| 55-148616 | 11/1980 | Japan . |

*Primary Examiner*—Ramon O. Ramirez
*Assistant Examiner*—Jerome A. DeLuca
*Attorney, Agent, or Firm*—R. Reams Goodloe, Jr.

[57] ABSTRACT

An implement holder. The implement holder is detachably affixable to a pre-selected substrate such as a glass window, mirror, or other suitable surface, for removably securing a pre-selected elongated implement such as a pen or pencil in a desired location. The devices are adjustable in multiple axes, so that in spite of various angular situations encountered with respect to one or more pre-selected substrates, the implement holder can be easily adjusted to secure a selected implement, such as a pen or pencil, in a desired orientation. The implement holder uses as a detachable securement device a flexible elastomeric suction cup. The suction cup has an attachment portion that is detachably affixable to the pre-selected substrate. Connected to and opposite the attachment portion a support portion. A fastener is affixed to the support portion to adjustably and slidably secure an implement cradle to the support portion. The implement cradle is preferably configured with a generally "C" shaped thin wall body, such as may be achieved by utilizing an arcuate portion of a short section of hard copper tubing. The implement cradle includes a preferably centrally disposed adjustable slide portion. The adjustable slide portion of the implement cradle and a frictional surface portion of the fastener are slidably engaged, so that the implement cradle is adjustable, both slidably and rotatably, but is frictionally secured to the support portion by the fastener. In a preferred embodiment the fastener is a screw and is adjustably affixed to the support portion with a threaded shaft portion. The screw has a head which a frictional surface at the rear of the head that is adapted for frictional engagement with the adjustable slide portion of the implement cradle. The implement holder provides a unique, simple, easy to use device for holding implements such a pens and pencils in a convenient location.

34 Claims, 5 Drawing Sheets

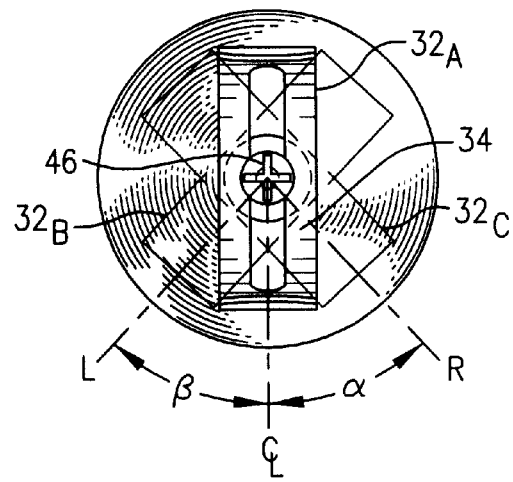
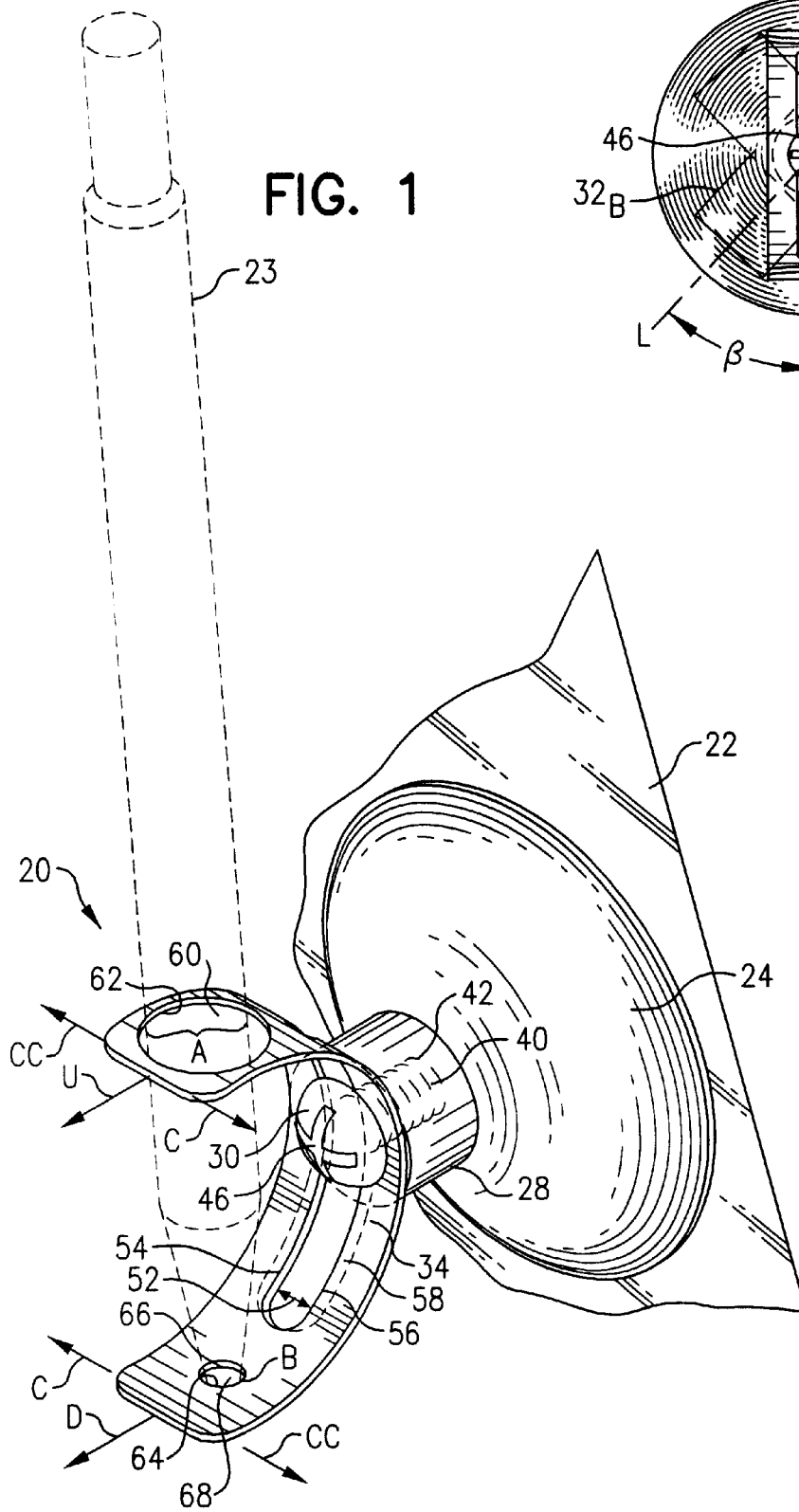

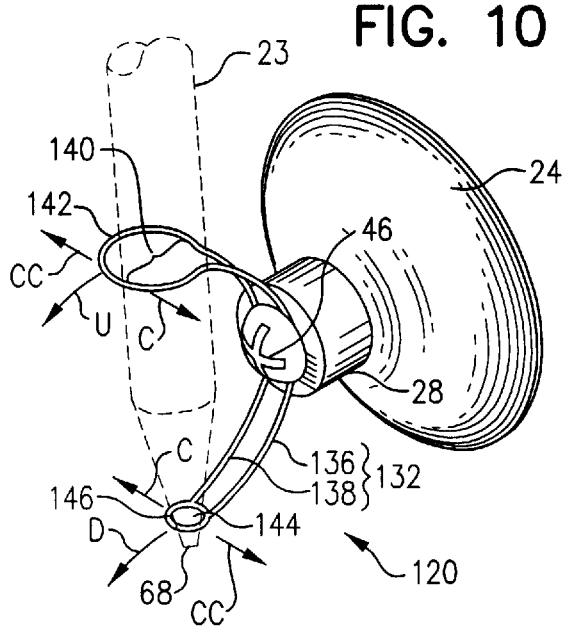
FIG. 10
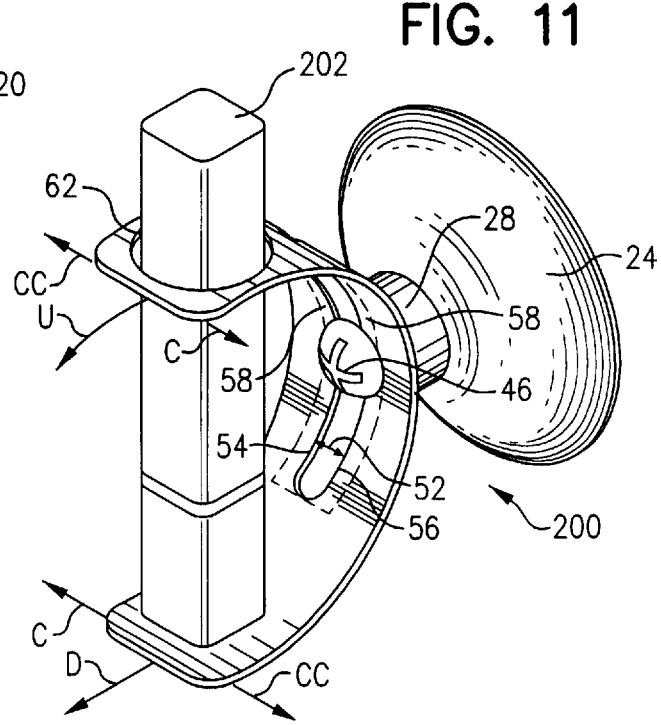
FIG. 11
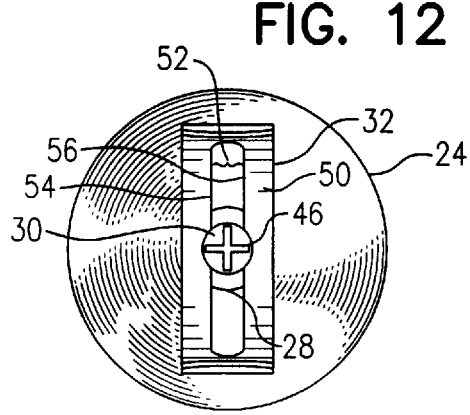
FIG. 12
FIG. 13

IMPLEMENT HOLDER

TECHNICAL FIELD

This invention relates to devices for holding small implements such as pens, pencils, and the like, to permit temporary storage of such articles in a position ready for use.

BACKGROUND

Many attempts have been made over the years to provide useful and unique devices for holding small objects, such as writing implements, in a position ready for manual retrieval and immediate use. Nevertheless, in various environments such as equipment control rooms or aircraft flight decks, where the use of such implements is necessary to record data vital to operation, personnel are still frequently frustrated at the unavailability of fully adequate implement holders. Consequently, a continuing demand exists for a simple and inexpensive device to secure small implements such as pens or pencils in a position for immediate use.

In general, I have found that currently available implement holders known to me have limited adjustment capability, so that the orientation of the object being held is not ideal. More particularly in operating vehicles, such as commercial aircraft, I have found that placement and orientation of pen and pencil holders leaves much to be desired. Due to the restricted space available, and the unique and often sharply angled surfaces which afford limited ability to permanently affix implement holders, there remains an ongoing need for a device which will readily attach to smooth surfaces. Moreover, there remains an ongoing need for an implement holder that will readily attach to smooth surfaces, that is adjustable along a preselected curved path (preferably along a suitable arc axis), and that is also adjustable around an axis of rotation, so that both the implement holder and the implement being supported can be held in a convenient orientation.

SUMMARY

I have now invented, and disclose herein, a novel, unique, adjustable implement holder. The implement holder is especially effective for temporary attachment to smooth surfaces. Most preferably, the device reliably and effectively assists users by being detachably affixable to a pre-selected substrate, such as aircraft windows. Moreover, the devices are preferably adjustable in multiple axes, so that in spite of various angular situations encountered with respect to one or more pre-selected substrates to which the implement holder is attached, the implement holder can be easily adjusted to secure a selected object, such as a pen or pencil, in a desired orientation. In the most preferred embodiment, my novel, adjustable implement holder is detachably affixable to a pre-selected substrate such as a glass window, mirror, or other suitable surface, for removably securing a pre-selected elongated implement such as a pen or pencil in a desired location and orientation. In one embodiment, a flexible elastomeric suction cup functions as a detachable securement device. The suction cup has an attachment portion which is detachably affixable to the pre-selected substrate, and which is adapted to resist (by vacuum force) removal from the pre-selected substrate. The detachable securement device preferably includes, connected to and preferably opposite the attachment portion, a support portion. A fastener is affixed to the support portion to secure thereto, in an adjustable, slidable fashion, an implement cradle. The implement cradle is preferably configured with a generally "C" shaped thin wall body, such as may be achieved by utilizing a short longitudinal length of a segment of an annulus, such as may be easily provided using a short linear section of hard copper tubing which has been arcuately segmented. (It is to be understood, though that other materials, such as plastic or other metals, may also be utilized to achieve the same result). The implement cradle includes a preferably centrally disposed adjustable slide portion. The adjustable slide portion of the implement cradle, and a frictional surface portion of the fastener, are slidably engaged, so that the implement cradle is adjustable, both slidably and rotatably, while being frictionally secured to the support portion by the fastener.

In a preferred embodiment, the fastener is a screw which is adjustably affixed to the support portion with a threaded shaft portion. The screw includes a head, with which or cooperating with which a frictional surface (normally at the rear or reverse side of the head) is provided, and which frictional surface is adapted for frictional engagement with the adjustable slide portion of the implement cradle.

In summary, my implement holder provides a unique, simple to manufacture, and easy to use device for holding implements such a pens and pencils in a convenient location.

OBJECT, ADVANTAGES, AND NOVEL FEATURES

From the foregoing, it will be apparent to the reader that one important and primary object of the present invention resides in the provision of a novel implement holder that will easily secure implements such as pens and pencils in pre-selected locations. My novel apparatus effectively secures pens and pencils, or other implements, at desired pre-selected locations near smooth surfaces such as glass window or wall surfaces, or similar surfaces such as mirrors or vanity tops.

One important object of the invention is to allow adjustment of the implement cradle portion of the implement holder, either before or after it is affixed to a pre-selected substrate.

It is an advantage of my implement holder that it can be rotatably adjusted, and also arcuately adjusted, so that an implement being held can be secured in a desired orientation.

It is a feature of my implement holder that the implement cradle is adjustable in orientation from the attachment base, yet the implement cradle is frictionally secured at any desired orientation.

One design objective of my implement holder the integration of form and function by eliminating unnecessary parts, thus allowing use which is intuitive and requires essentially no training or previous experience. It is a feature of the present invention that use of my implement holder is easily facilitated, and avoids use of any difficult to manipulate components. Ideally, sufficient friction is developed to hold the implement cradle in a desired orientation without need of or resort to adjustment devices.

Another object my invention is to provide easy to use implement holders. This is important, but seemingly overlooked heretofore, since users such pilots frequently need to quickly retrieve a pen or pencil while focusing on airmanship duties at hand, and thus avoid any need for attention to securing or repositioning the implement holder helps avoid distractions in the cockpit. It is a feature that the implement holders disclosed and described herein are adaptable for reliable use throughout a range of angles and orientations, with a minimum of user manipulation.

Yet another design objective is flexibility of location and placement of the implement holder. It is an important feature of my invention that the implement holder is adaptable for attachment to a variety of surfaces, and particularly smooth surfaces, and can be adjusted at any such pre-selected location with the reasonable reach of the user. In this manner, my novel implement holder may be used in a wide variety of locations, for convenient, preselected implements such as pens and pencils.

Another important and useful objective of my design is portability. It is an advantage of my invention that the implement holder can be easily removed from a desired operation location such as an aircraft cockpit, placed into a pilot's flight bag, and transported to a new aircraft for re-use. This is particularly important in environments where the use of such devices is up to individual airmen, rather than being furnished as a part of the equipment for use when the pilot arrives.

Another design objective is structural stability, i.e., minimum weight and a balanced design. This is important since it is preferable that the implement holder be relatively light so that it tends to remain attached indefinitely to a pre-selected substrate. Also, it is preferably constructed so that it can be positioned wherever desired, without fear of the implement holder damaging any other equipment if it is inadvertently dislodged during use. Thus, it is an important advantage and novel feature that my apparatus is designed with relatively lightweight materials, and that it is not prone to becoming dislodged or unattached to the pre-selected substrate.

Finally, it is an important objective of my design that the implement holder is manually adjustable in arc (i.e. along the curved path—when viewed in cross section—of the instrument cradle, which is most preferably provided along a segment of an annulus) to tilt the implement being held, while also allowing rotation 360 degrees about the point of attachment of the implement cradle to the support portion. Further, the implement holder can be easily removed by the user, and securely repositioned.

Other important and more specific objects, advantages, and novel features of the invention will become apparent to the reader from the foregoing and from the appended claims, as well as the ensuing detailed description and discussion which proceeds in conjunction with the accompanying drawing.

BRIEF DESCRIPTION OF THE DRAWING

In the drawing:

FIG. 1 is a perspective view of my implement holder; it shows a generally "C" shaped implement cradle with an implement receiving aperture defined by inlet edge portions adapted to securely receive an implement such as a pen or pencil, and to support the implement at the edges of the lower implement support aperture.

FIG. 2 shows a front side view of my implement holder, illustrating the rotary motion available for adjustment of the generally "C" shaped implement cradle to any desired orientation.

FIG. 10 illustrates yet another embodiment of my implement holder, wherein the implement cradle is provided in a pre-formed wire structure having a partial wire loop implement inlet aperture, and a lower small wire loop implement support aperture.

FIG. 11 illustrates the use of my implement holder to secure an object such as a lipstick container.

FIG. 12 illustrates a front elevation view, similar to the view first shown in FIG. 2 above, but more clearly illustrating the arcuate slide portion of the implement cradle.

FIG. 13 illustrates a back elevation view, similar to the view first shown in FIG. 3 above, but now omitting the broken lines showing the implement cradle, to more clearly illustrate one desirable design for use of a suction cup as a detachable securement device.

DETAILED DESCRIPTION

Figure 3:
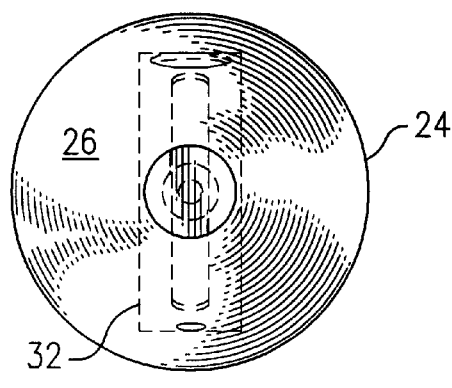
FIG. 3 shows a back side view of my implement holder, illustrating the view when the implement cradle is entered with respect to the fastener used to attach the implement cradle to the support portion of the suction cup.
Figure 4:
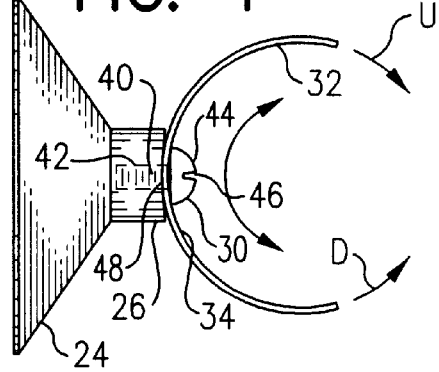
FIG. 4 shows a right side view (from the left, looking to the right) that illustrates the implement cradle when centered, vertically, similar to the situation first illustrated in FIG. 1 above.
Figure 5:
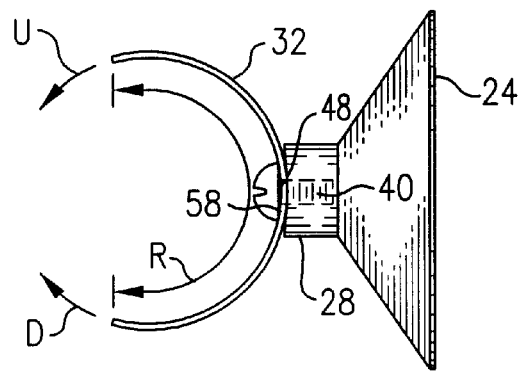
FIG. 5 is shows a left side view (from the right, looking to the left) that illustrates the implement cradle when centered, vertically.

As seen in FIG. 1, I have developed a novel and useful implement holder 20 is which is detachably affixable to a pre-selected substrate 22 such as a glass window, or other suitable surface, for removably securing a pre-selected elongated implement 23 (shown in broken lines). In one preferred, embodiment, implement holder 20 has a detachable securement device such as suction cup 24 which has an attachment portion 26 (see FIGS. 3 and 13 for direct view) which is detachably affixable to the pre-selected substrate 22 and adapted to resist removal from the pre-selected substrate by vacuum forces. The suction cup 24 also has, connected to and opposite the attachment portion 26, a support portion 28. A fastener 30 is affixed to the support portion to adjustably secure an implement cradle 32 to the support portion 28. Desirable suction cups are commonly available in various elastomers.

In one preferred embodiment as shown in FIG. 1, the fastener 30 is adjustably affixed to the support portion 28. This can be accomplished by any convenient apparatus, but is conveniently done with a threaded shaft portion 40 on fastener 30; ideally, the fastener 30 is a screw as depicted in FIG. 1. In this case, the support portion 28 of the suction cup 24 includes a preferably centrally located threaded receiver portion 42 which is sized and shaped to receive and interfittingly engage the threaded shaft portion 40 of the fastener 30. Also, the fastener 30, ideally a screw, preferably has a head 44 including an engageable surface portion 46 adapted for receiving manual or tool assisted forces for urging an adjustment to the position of the fastener 30. More preferably, the head 44 is of greater diameter than the threaded shaft portion 40, so that the head 44 has a frictional surface 48, normally at the rear of head 44 (on the side toward the support portion 28) that is adapted for frictional engagement with the adjustable slide portion 34 of the implement cradle 32.

As shown throughout the various figures, I prefer to provide an implement cradle 32 that has, generally, a "C" shape, when viewed from the side, as seen in FIGS. 4 and 5, or 14 and 15. Preferably, this "C" shape is an angular segment of an annulus. In this design, the adjustable slide portion 34 of the implement cradle 32 has an arcuate surface portion 50 which has an interior slot 52 of width W which is at least partially defined by first 54 and second 56 lateral edges, and at least one frictional area portion 58 that is adjacent the interior slot 52. In this manner, the frictional area portion 58 of the adjustable slide portion 34 of the implement cradle 32 (see FIGS. 1 and 11, for example) and the frictional surface 48 of the fastener 30, cooperate to adjustably, slidably, and frictionally secure the implement cradle 32.

Figure 9:
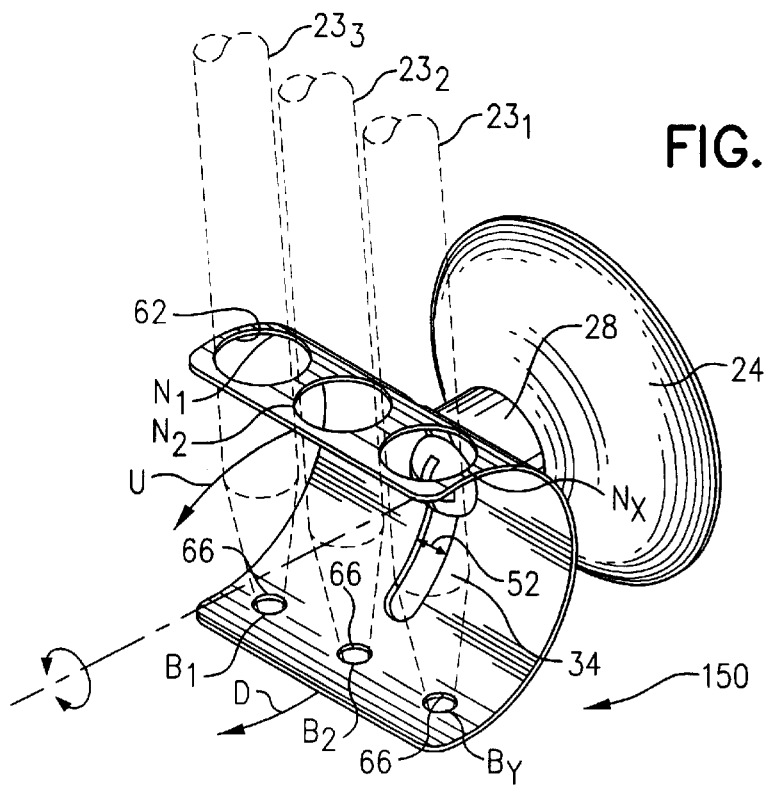
FIG. 9 provides a perspective view of yet another embodiment of my implement holder, showing a design which provides a plurality of implement inlet apertures and a corresponding number of implement support apertures.
Figure 14:
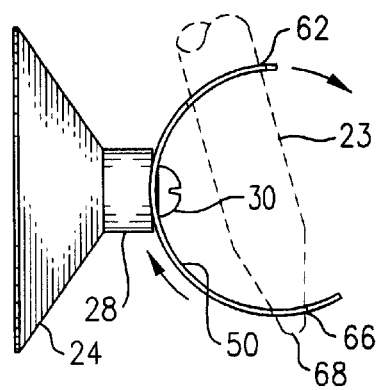
FIG. 14 illustrates a side elevation view, similar to the view first shown in FIG. 4 above, but now illustrating arcuate movement of the implement cradle to allow an inwardly directed angle on an elongated implement being supported in my implement holder.
Figure 15:
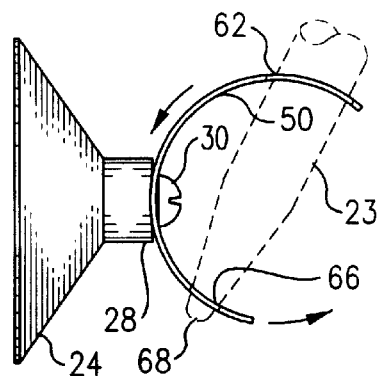
FIG. 15 illustrates a side elevation view, similar to the view just shown in FIG. 14, but now illustrating the arcuate movement of the implement cradle to allow an outwardly directed angle on an elongated implement being supported in my implement holder.

To hold a preselected elongate implement 23, such as a pen or pencil, the implement cradle 32 is provided with (a) an implement inlet aperture 60 defined by an inlet edge wall 62, and (b) an implement support aperture 64 defined by an implement support edge wall 66. The implement inlet edge wall 62 is of pre-selected size to accommodate an implement 23 of at least slightly smaller cross-sectional dimension at a pre-selected longitudinal station (such as at position A as shown in FIG. 1). Likewise, the implement support edge wall 66 is of pre-selected size to accommodate therein at least a portion, but not all, of a first end 68 of a pre-selected elongate implement 23 of pre-selected size, so that said elongate implement, at a pre-selected longitudinal station B as shown in FIG. 1 or FIG. 9, cannot fully pass through the implement support aperture 64, so that the elongate implement 23 is fully supported by the support edge wall 66.

Figure 6:
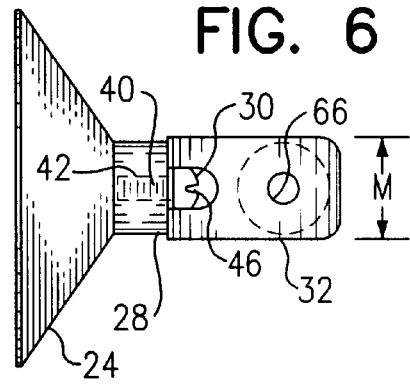
FIG. 6 shows a bottom view of my implement holder, showing the implement cradle in a vertical orientation, with the implement support aperture visible at the bottom in solid lines, and the implement inlet aperture shown in broken lines; also, the fastener is noted peeking through the adjustment slot.
Figure 7:
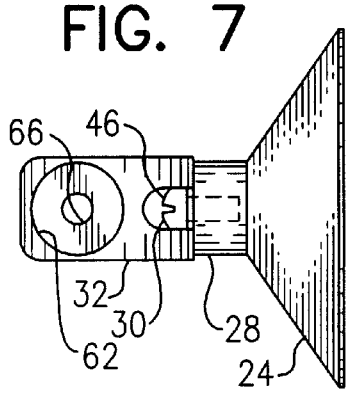
FIG. 7 provides a top view of my implement holder, showing the implement cradle in a vertical orientation, with the implement inlet aperture shown in solid lines, and the implement support aperture also visible a the bottom in solid lines.

More generally, I have found it advantageous to provide the implement cradle 32 with an interior slot 52 in the shape of an elongate oval that has been wrapped transversely about a portion of the surface of a cylinder, to effect the general "C" shape described above. This desirable shape can also be easily achieved by using arcuate segments from a short section of thin wall copper pipe, for example. Alternately, the interior slot 52 can be shaped a little more rectangularly, and provided generally in the shape of a rectangular opening situated as if having been wrapped transversely about a portion of the surface of a cylinder. When using a thin wall pipe to construct the implement cradle 32, the implement cradle 32 is ideally provided in the form of a thin, planar sheet of width M and length R (see FIGS. 5 and 6), shaped as if wrapped transversely about a portion of the curved surface of a cylinder.

Figure 8:
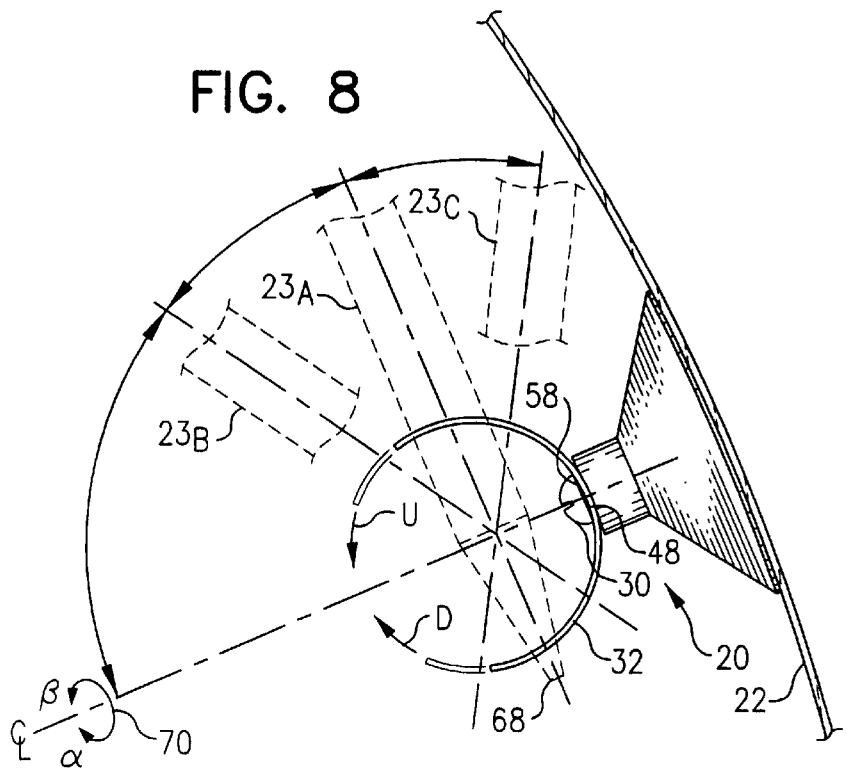
FIG. 8 provides a side view of my implement holder in use on a slightly curved surface such as an inwardly sloping aircraft window, showing, in particular, the arcuately repositionable implement cradle.

Turning now to FIG. 8, it is seen how my implement holder 20 can be detachably affixed to surface 22 such as a window. The implement 23 can be supported in a variety of angular locations, here shown by alternative locations of elongate implements $23_A$, $23_B$, and $23_C$ by arcuate sliding adjustment of the implement holder 32. The advantageous angular repositioning allowed by my implement holder is also depicted, in another orientation, in FIGS. 14 and 15.

Also, as indicated in FIGS. 2 and 8, the implement cradle 32 can be rotated to the left L by an angle beta ($\beta$), or to the right R by an angle alpha ($\alpha$). Preferably, the angles beta ($\beta$) and alpha ($\alpha$) are not limited, and the implement cradle 32 can be rotated at least 360 degrees. For modest rotations alpha ($\alpha$), or beta ($\beta$), of about forty five degrees, as depicted in FIG. 2, the implement cradle $32_A$ is shown a the central location along the centerline, and implement cradle $32_B$ is shown in the position as if cradle $32_A$ were rotated to the left, or clockwise ("c"), and implement cradle $32_C$ is shown in the position as if implement cradle $32_A$ were rotated to the right, or counter-clockwise ("cc"). Clockwise movement "c" and counter-clockwise "cc" movement possible with embodiments of some of the implement cradles illustrated in other figure are noted in some cases with reference arrows "c" for clockwise movement, or "cc" for counter-clockwise movement. Also, in FIG. 8, the rotational movement (either to the right or to the left) is indicated by arrow 70 about the center line $C_L$. Finally, in many of the figures, the arcuate movement is depicted in a downward direction by reference arrows "D", and in an upward direction by reference arrows "U".

Turning now to FIG. 10, another embodiment 120 of my implement holder is illustrated. This embodiment utilizes an implement cradle 132 manufactured from wire. In this case, the adjustable slide portion 134 of the implement cradle 132 is made from spaced apart, substantially identically shaped wire portions 136 and 138. Ideally, the wire used for these shaped wire portions 136 and 138 is substantially cylindrical, in transverse cross-section. In this embodiment, each of at least one implement inlet apertures 140 is defined by an at least partially formed wire loop 142 that is of pre-selected size to accommodate an implement 23 of at least slightly smaller cross-sectional dimension the longitudinal station corresponding to the wire loop 142 location, when implement 23 is supported in holder 120. Generally, I prefer to provide the at least partially formed wire loop 142 and the shaped wire portions 136 and 138 of the implement cradle 132 integrally formed from a single wire. This implement holder 120 also includes at least one implement support aperture 144 which is defined by at least one small wire loop portion 146. The at least one small wire loop portion 146 is provided in a pre-selected size to accommodate therein at least a portion, but not all, of a first end 68 of an elongate implement 23 of pre-selected size, so that the elongate implement 23 is supported by the at least one small wire loop portion 146.

Referring now to FIG. 9, another embodiment 150 of my implement holder is depicted. Here, a plurality of implement inlet apertures 60 are provided in a series of implement support apertures 60 starting from N=1 and running through N=X, with each implement inlet aperture 60 being defined by a corresponding implement inlet edge wall portion 62 in a series from $62_1$ to $62_x$. Likewise, a plurality of implement support apertures 64 in a series of implement support apertures starting from B=1 and running through B=Y (Y being a positive integer greater than one) are provided, with each implement support aperture 64 in the plurality of implement support apertures 64 defined by a support edge wall 66 in a series from $66_1$ to $66_y$. As in the other embodiments, each of the support edge walls 66 are provided in a pre-selected size to accommodate therein at least a portion, but not all, of a first end 68 of an elongate implement 23 of pre-selected size, so that the elongate implement 23 is supported by a selected one of the support edge wall 66 in the series of support edge walls. As shown, three elongate implements $23_1$, $23_2$, and $23_3$, are shown supported by a single implement holder 150.

In a similar fashion, the implement holder 120 shown in FIG. 10 can likewise be provided with the capability to receive multiple implements 23. In such a case, the implement cradle 132 comprises a plurality of implement inlet apertures 140 in a series of implement apertures 140 starting from N=1 and running through to N=Z (Z being a positive integer greater than one) with each implement aperture 140 in the plurality of implement apertures 140 being defined by an at least partially formed wire loop portion 142 in a series of at least partially formed wire loop portions 142 from $142_1$ to $142z$. Likewise, a plurality of implement support apertures 144 in a series of implement support apertures 144 starting from B=1 and running through B=W is provided, with each implement support aperture 144 in the plurality of implement support apertures 144 being defined by a small wire loop portion 146 in a series of small wire loop portions 146 from $146_1$ to $146_w$. Similar to other embodiments, each of the small wire loop portions 146 in the series are of pre-selected size to accommodate therein at least a portion, but not all, of a first end 68 of an elongate implement 23 of pre-selected size, so that the elongate implement 23 is supported by a selected one of the small wire loop portions 146.

Overall, I prefer that in my implement holders, such holder 20 shown in FIGS. 1–8, that the implement inlet aperture 62 be substantially circular in shape. Also, in such cases, I also prefer that the implement support aperture 62 be substantially circular in shape. In order to accommodate most elongated implements 23 such as pens or pencils, it is desirable that the implement inlet aperture 62 be of greater diameter than the implement support aperture 66.

In FIG. 11, another embodiment 200 of my implement holder is depicted for holding elongate objects such as a lipstick carrier 202. The exact shape and size of the heretofore described elements of my implement holder can be varied to accommodate such a carrier 202 of any pre-selected size.

Figure 16:
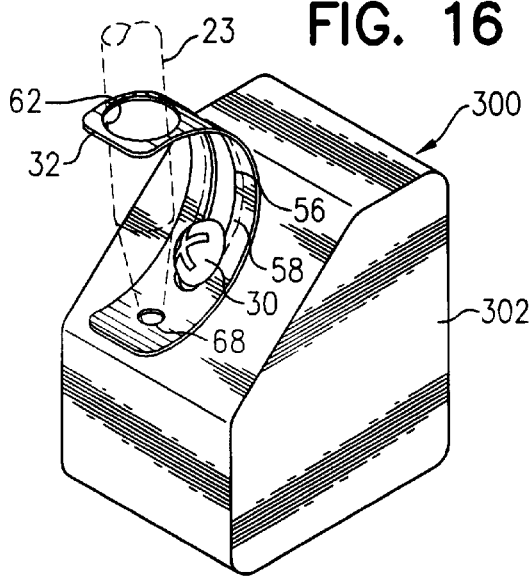
FIG. 16 illustrates yet another embodiment of my implement holder, and shows a solid base having adjustably mounted thereon a generally "C" shaped implement cradle having an implement receiving aperture which is defined by inlet edge portions, and that is adapted to securely receive an implement such as a pen or pencil, and to support such an implement.
Figure 17:
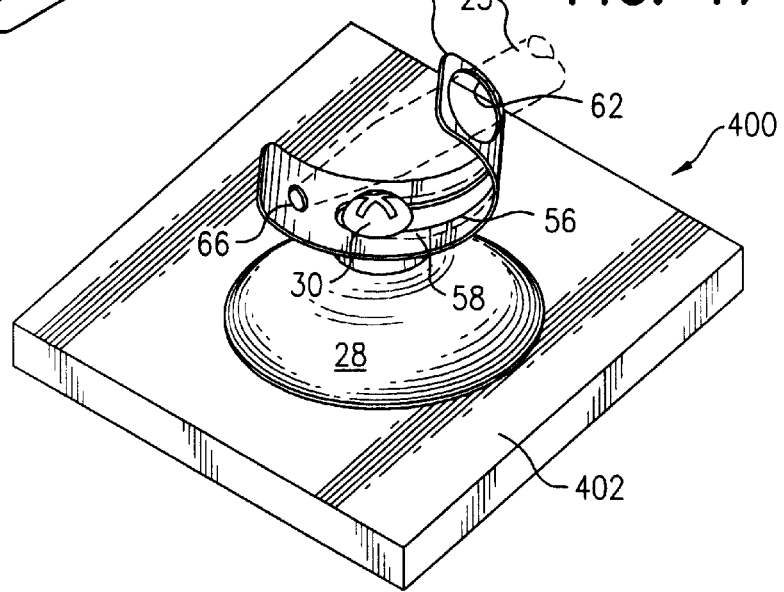
FIG. 17 illustrates still another embodiment of my implement holder, and shows a small, relatively flat base (which can be placed on, or permanently or detachably affixed to a selected substrate via a suitable fastening system) having thereon a small upwardly protruding support portion which has adjustably mounted thereon a generally "C" shaped implement cradle which has an implement receiving aperture that is defined by inlet edge portions, and which is adapted to securely receive and support an implement such as a pen or pencil.

Yet another embodiment 300 of my invention is shown in FIG. 16. A similar embodiment 400 is shown in FIG. 17. In both FIG. 16 and FIG. 17, a generally "C" shaped implement cradle 32 (as shown described above) is securely but adjustably mounted on and to a stationary base 302, or stationary base 402, respectively. The adjustably mounted "C" shaped instrument cradle 32, or alternate instrument cradles as described herein (or any similar device falling within the legal equivalents thereof), are affixed to the selected stationary base 302 or 402. One convenient method for affixing the implement cradle 32 is to use a fastener 30 to cooperate with and to adjustably, slidably, and frictionally secure the implement cradle 32 to the selected base 302 or 402, in a similar manner as more particularly described herein above with reference to affixing implement cradle 32 to a detachable securement device. However, fastener 30 need not be adjustable, and alternately could be fixed at any appropriate location, yet providing sufficient friction to slidably and adjustably secure the implement cradle 32 at such fixed location.

It will thus be seen that the objects set forth above, including those made apparent from the preceding description, are efficiently attained. Since certain changes may be made in carrying out the construction of a implement holder according to the teachings herein, it is to be understood that my invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, the drawing, and the abstract) may be combined in any combination, except combinations where at least some of the features are mutually exclusive. Each feature disclosed in this specification (including any accompanying claims, the drawing, and the abstract), may be replaced by alternative features serving the same or similar purpose, unless expressly stated otherwise. Thus, unless expressly stated otherwise, each feature disclosed is one example only of a generic series of equivalent or similar features. Further, while certain materials are described for the purpose of enabling the reader to make and use certain embodiments shown, such suggestions shall not serve in any way to limit the claims to the materials disclosed, and it is to be understood that other materials, including other metals and various plastic compositions, may be utilized in the manufacture of my novel implement holders.

The intention is to cover all modifications, equivalents, and alternatives falling within the scope and spirit of the invention, as expressed herein above and in the appended claims. As such, the claims are intended to cover the structures, apparatus, and methods described herein, and not only the equivalents or structural equivalents thereof, but also equivalent structures or methods. Thus, the scope of the invention, as described herein and as indicated by the appended claims, is intended to include variations from the embodiments provided which are nevertheless described by the broad meaning and range properly afforded to the language of the claims, as explained by and in light of the terms included herein, or the equivalents thereof.

I claim:

1. A writing implement holder detachably affixable to a pre-selected substrate, said writing implement holder comprising:
    (a) a suction cup, said suction cup comprising
        (i) an attachment portion detachably affixable to a pre-selected substrate and adapted to resist removal from said pre-selected substrate by vacuum forces, and
        (ii) a support portion, said support portion connected to said attachment portion;

(b) a fastener, said fastener affixed to said support portion, said fastener further comprising a frictional surface portion;

(c) a writing implement cradle, said writing implement cradle further comprising an adjustable slide portion, said adjustable slide portion of said implement cradle and said frictional surface portion of said fastener slidably engaged, so that said writing implement cradle is adjustably, slidably, and frictionally secured.

2. A holder for removably supporting a selected writing implement said writing implement holder comprising:

(a) a base, said base further comprising a support portion;

(b) a fastener, said fastener affixed to said support portion, said fastener further comprising a frictional surface portion;

(c) a writing implement cradle, said writing implement cradle further comprising an adjustable slide portion, said adjustable slide portion of said implement cradle and said frictional surface portion of said fastener slidably engaged, so that said writing implement cradle is adjustably, slidably, and frictionally secured.

3. The writing implement holder as set forth in claim 1, or claim 2, wherein said fastener is adjustably affixed to said support portion.

4. The writing implement holder as set forth in claim 3, wherein said writing implement cradle further comprises an implement inlet aperture, said implement inlet aperture defined by an inlet edge wall, said implement inlet aperture of pre-selected size to accommodate an implement of at least slightly smaller cross-sectional dimension at a pre-selected longitudinal station.

5. The writing implement holder as set forth in claim 4 wherein said writing implement cradle further comprises an implement support aperture, said implement support aperture defined by a support edge wall, said support edge wall of pre-selected size to accommodate therein at least a portion, but not all, of a first end of an elongate implement of pre-selected size, so that said elongate implement cannot fully pass through said implement support aperture, and wherein said elongate implement is supported by said support edge wall.

6. The writing implement holder as set forth in claim 5, wherein said writing implement cradle further comprises a thin, planar sheet of width M and length R, said writing implement cradle shaped as if wrapped transversely about a portion of the rounded surface of a cylinder.

7. The writing implement holder as set forth in claim 5, wherein said implement support aperture is substantially circular.

8. The writing implement holder as set forth in claim 5, wherein said implement inlet aperture has a greater diameter than said implement support aperture.

9. The writing implement holder as set forth in claim 4, wherein said implement inlet aperture is substantially circular.

10. The writing implement holder as set forth in claim 1, or claim 2, wherein said writing implement cradle further comprises a generally "C" shaped body portion.

11. The writing implement holder as set forth in claim 1, or claim 2, wherein said adjustable slide portion of said writing implement cradle further comprises an arcuate surface portion, said arcuate surface portion comprising (a) an interior slot at least partially defined by first and second lateral edges, and (b) at least one frictional area portion, said at least one frictional area portion adjacent said interior slot;

(c) said at least one frictional area portion of said implement cradle and said frictional surface portion of said fastener cooperating to adjustably, slidably, and frictionally secure said implement cradle.

12. The writing implement holder as set forth in claim 5, wherein said interior slot is provided substantially in the shape of an elongate oval wrapped transversely about a portion of the rounded surface of a cylinder.

13. The writing implement holder as set forth in claim 11, wherein said interior slot is provided substantially in the shape of a rectangular opening wrapped transversely about a portion of the rounded surface of a cylinder.

14. The writing implement holder as set forth in claim 11, wherein said arcuate surface portion of said adjustable slide portion of said writing implement cradle comprises spaced apart, substantially identically shaped wire portions.

15. The writing implement holder as set forth in claim 14, wherein said wire is substantially cylindrical, in transverse cross-section.

16. The writing implement holder as set forth in claim 14, wherein said writing implement cradle further comprises at least one implement inlet aperture, each of said at least one implement inlet apertures defined by an at least partially formed wire loop, and wherein said at least one implement inlet aperture is of pre-selected size to accommodate an implement of at least slightly smaller cross-sectional dimension at a preselected longitudinal station.

17. The writing implement holder as set forth in claim 14, wherein said at least partially formed wire loops and said shaped wire portions of said writing implement cradle are integrally formed from a single wire.

18. The writing implement holder as set forth in claim 14, wherein said writing implement cradle further comprises at least one implement support aperture, said at least one implement support apertures each defined by at least one small wire loop portion, said at least one small wire loop portion of pre-selected size to accommodate therein at least a portion, but not all, of a first end of an elongate implement of pre-selected size, so that said elongate implement is supported by said at least one small wire loop portion.

19. The writing implement holder as set forth in claim 14, wherein said writing implement cradle further comprises:

(a) a plurality N of writing implement inlet apertures in a series from N=1 to N=X, each writing implement inlet aperture of said plurality of writing implement inlet apertures being defined by an inlet edge wall portion in a series from $N_1$ to $N_x$; and (b) a plurality B of writing implement support apertures in a series from B=1 to B=Y, each writing implement support aperture of said plurality of writing implement support apertures defined by a support edge wall in a series from $B_1$ to $B_y$, each of said support edge walls in said series of pre-selected size to accommodate therein at least a portion, but not all, of a first end of an elongate writing implement of pre-selected size, so that said elongate writing implement is supported by a selected one of said support edge walls in said series of support edge walls.

20. The writing implement holder as set forth in claim 1, or in claim 2, wherein said writing implement cradle further comprises:

(a) a plurality N of writing implement inlet apertures in a series from N=1 to N=Z, each writing implement inlet aperture of said plurality of writing implement inlet apertures being defined by an at least partially formed wire loop portion in a series of at least partially formed wire loop portions in a series from $N_1$ to $N_z$; and (b) a plurality B of writing implement support apertures in a series from B=1 to B=W, each writing implement support aperture of said plurality of writing implement support apertures defined by a small wire loop portion in a series of small wire loop portions from $B_1$ to $B_w$, each of said small wire loop portions said series of pre-selected size to accommodate therein at least a portion, but not all, of a first end of an elongate writing implement of pre-selected size, so that said elongate writing implement is supported by a selected one of said small wire loop portions.

21. The writing implement holder as set forth in claim 1, or in claim 2, wherein said fastener comprises a screw, said screw comprising a threaded shaft portion.

22. The writing implement holder as set forth in claim 21, wherein said support portion of said suction cup further comprises a threaded receiver portion sized and shaped to receive and interfittingly engage said threaded shaft portion of said screw.

23. The writing implement holder as set forth in claim 21, wherein said screw further comprises a head, said head comprising an engageable surface adapted for receiving manual or tool assisted forces for urging an adjustment to the position of said screw.

24. The writing implement holder as set forth in claim 23, wherein said head of said screw is of greater diameter than said shaft portion of said screw, and wherein said head further comprises a frictional surface, said frictional surface adapted for frictional engagement with said adjustable slide portion of said implement cradle.

25. The writing implement holder as set forth in claim 24, wherein said frictional surface of said head of said screw is disposed on a side of said head toward said support portion of said suction cup.

26. The writing implement holder as set forth in claim 1, or in claim 2, wherein said writing implement cradle is rotatably adjustable with respect to said support portion.

27. The writing implement holder as set forth in claim 26, wherein said writing implement cradle is rotatably adjustable for a full 360 degrees with respect to said support portion.

28. The writing implement holder as set forth in claim 1, claim 2, wherein said writing implement cradle is arcuately and slidably adjustable with respect to said fastener.

29. A writing implement holder detachably affixable to a preselected substrate, said implement holder comprising:

(a) a detachable securement section, said detachable securement section comprising
  (i) an attachment portion detachably affixable to a pre-selected substrate, and
  (ii) a support portion;
(b) a fastener, said fastener affixed to said support portion, said fastener further comprising a frictional surface portion;
(c) a writing implement cradle, said implement cradle further comprising an adjustable slide portion, said adjustable slide portion of said implement cradle and said frictional surface portion of said fastener slidably engaged, so that said writing implement cradle is adjustably and frictionally secured to said support portion.

30. The writing implement holder as set forth in claim 29, wherein said fastener is adjustably affixed to said support portion.

31. The writing implement holder as set forth in claim 29, wherein
(a) said adjustable slide portion of said writing implement cradle comprises a thin, arcuate shaped body, and
(b) said writing implement cradle is slidably displaceable along an arcuate axis.

32. The writing implement holder as set forth in claim 29, wherein said detachable securement section comprises a suction cup, said suction cup adapted for adhering to a pre-selected substrate by resisting attempted removal with vacuum force.

33. The writing implement holder as set forth in claim 32, wherein said fastener is adjustably affixed to said support portion.

34. A holder for removably supporting a selected writing implement, said writing implement holder comprising:
(a) a base, said base further comprising a support portion;
(b) a fastener, said fastener affixed to said support portion, said fastener further comprising a frictional surface portion;
(c) a writing implement cradle, said implement cradle further comprising an adjustable slide portion, said adjustable slide portion of said writing implement cradle and said frictional surface portion of said fastener slidably engaged, so that said writing implement cradle is adjustably, slidably, and frictionally secured.

* * * * *